United States Patent [19]

Sengupta

[11] Patent Number: 4,694,438
[45] Date of Patent: Sep. 15, 1987

[54] TIME-OFFSET-FREQUENCY-AMPLITUDE PANELS FOR SEISMIC IDENTIFICATION OF HYDROCARBONS

[75] Inventor: Mrinal K. Sengupta, Houston, Tex.
[73] Assignee: Exxon Production Research Company, Houston, Tex.
[21] Appl. No.: 729,508
[22] Filed: May 2, 1985
[51] Int. Cl.⁴ .......................... G01V 1/00; G06F 15/58
[52] U.S. Cl. ...................................... 367/70; 367/49; 367/43; 364/421
[58] Field of Search ...................... 367/43, 44, 70, 47, 367/56, 49; 340/701; 346/33 C; 364/526, 421; 343/14; 342/122, 128

[56] References Cited

U.S. PATENT DOCUMENTS

| | | | |
|---|---|---|---|
| 2,279,191 | 4/1942 | Adler | 367/49 X |
| 2,622,691 | 12/1952 | Ording | 367/49 |
| 3,243,821 | 3/1966 | Bogs et al. | 367/70 X |
| 3,292,143 | 12/1966 | Russell . | |
| 3,381,266 | 4/1968 | Harris | 367/56 X |
| 4,312,050 | 1/1982 | Lucas | 367/43 X |
| 4,316,267 | 2/1982 | Ostrander . | |
| 4,316,268 | 2/1982 | Ostrander . | |

FOREIGN PATENT DOCUMENTS

| | | | |
|---|---|---|---|
| 705549 | 3/1965 | Canada | 340/13 |
| 1594633 | 8/1981 | United Kingdom . | |
| 2090409A | 7/1982 | United Kingdom . | |
| 2138135A | 10/1984 | United Kingdom . | |

OTHER PUBLICATIONS

N. A. Haskell, "The Dispersion of Surface Waves on Multilayered Media," Bulletin of the Seismological Society of America, 1953, vol. 43, No. 1, pp. 17–34.
N. A. Haskell, "Crystal Reflection of Plane P and SV Waves," Journal of Geophysical Research, Nov. 1962, vol. 67, No. 12, pp. 4571–4767.

Primary Examiner—Thomas H. Tarcza
Assistant Examiner—Tod Swann
Attorney, Agent, or Firm—Alfred A. Equitz

[57] ABSTRACT

A method for preparing a display of seismic data obtained from multiple-point coverage of a subterranean earth formation using an array of seismic sources and acoustic receivers. A set of seismic traces is obtained in such a manner that each trace is associated with a source-receiver pair separated by a particular offset distance, and all the traces are associated with a common subsurface reflection point. Each of the traces is filtered through a bank of band-pass filters to produce a set of filtered traces, each having a different frequency content, for each offset value. The filtered traces associated with a particular offset value are displayed in order of progressively changing frequency content, and the filtered traces associated with a particular frequency band are displayed in order of progressively changing offset value. The seismic traces are preferably processed prior to the band-pass filtering step to reduce source-generated noise, to compensate for non-geologic factors such as geometric divergence and source strength variation, and to flatten hyperbolic (or pseudo-hyperbolic) primary reflections. In one preferred embodiment, groups of filtered traces having offset values in a selected range and representing the output of one of the band-pass filters are stacked together, and the stacked traces are displayed in order to progressively changing frequency content or progressively changing ranges of offset values.

18 Claims, 5 Drawing Figures

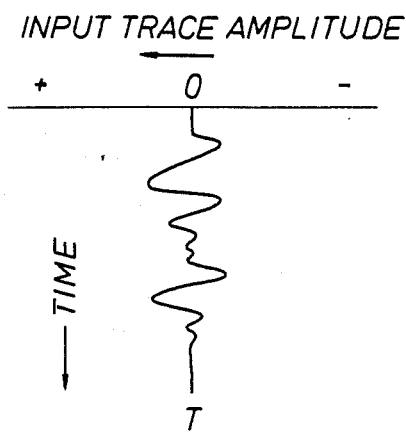
FIG.1
FIG.2
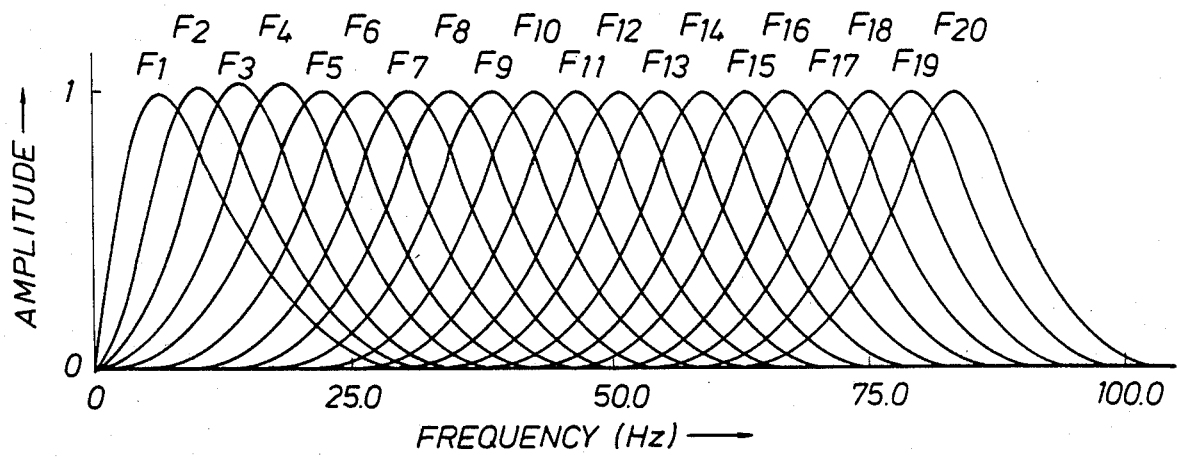
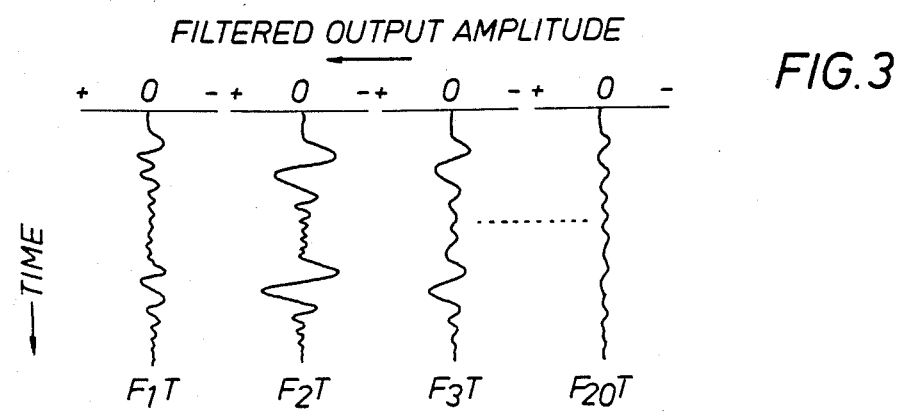
FIG.3

TIME-OFFSET-FREQUENCY-AMPLITUDE PANELS FOR SEISMIC IDENTIFICATION OF HYDROCARBONS

FIELD OF THE INVENTION

This invention relates in general to seismic prospecting. In particular, it relates to a technique for generating a display of seismic data obtained from multiple-point coverage of a subterranean earth formation using an array of seismic sources and an array of acoustic detectors.

BACKGROUND OF THE INVENTION

Since about 1960, the so-called common depth point ("CDP") or common reflection point seismic technique has been almost universally used to improve the quality of seismic records so as to make the records more susceptible to interpretation. The CDP technique involves carefully spacing seismic sources and seismic detectors, and combining individual seismic record traces so that reflection events from common reflection points (or locations) on subsurface strata are additively combined to reinforce each other, and unwanted noise events are canceled.

In performing CDP operations, seismic traces, each representing an acoustic signal received at a seismic receiver after having propagated away from a seismic source, are gathered into sets of traces ("CDP gathers") in which each trace of the set represents reflections from a common subsurface point. The primary reflection signals along the traces in each CDP gather all fall along a generally hyperbolic curve known as the normal moveout curve. Typically, the seismic traces in each CDP gather are processed to compensate for the time differentials in the occurrence of the primary reflection signals caused by this normal moveout. Such compensation aligns all the primary reflection signals at the same point on the time axis of the seismic traces. Conventionally, the seismic traces are then stacked to form a composite trace for each common reflection point, such stacking again enhancing the primary reflection signals relative to multiples and noise. These composite traces are then conventionally displayed in side-by-side relationship in the form of a seismic section. Such a seismic section indicates continuous primary seismic reflections and is a useful tool for the geophysicist in determining the acoustic velocity characteristics of the subterranean formation associated with such continuous reflections.

It is well known that the variation of the reflection amplitude of seismic traces with angle of incidence with respect to a reflecting subterranean interface, or with "offset distance" (i.e., distance between the source and the receiver associated with a particular trace), may be interpreted as an indicator of the presence or absence of gas in association with a reflecting subterranean interface.

For example, each of U.S. Pat. No. 4,316,267 issued Feb. 16, 1982 to Ostrander and U.S. Pat. No. 4,316,268 issued Feb. 16, 1982 to Ostrander discloses a method of preparing and interpreting a display of seismic data for the purpose of distinguishing gas related "bright spots" (high-amplitude anomalies in seismic traces) from other bright spots. In the most basic form of practicing this method, a single stacked trace (representing a stack of individual seismic traces in a CDP gather of traces) passing through the bright spot of interest on a seismic section is selected for analysis. This stacked trace is separated into the individual traces from which it was originally composed. These individual traces are then displayed side-by-side in order of progressively changing source-receiver offset distance. The resulting display permits an interpreter to examine the reflectivity of the reflecting interface of interest as a function of source-receiver offset distance. The Ostrander patents teach that, for reflections from the upper boundary of a gas reservoir, the amplitude of the reflection usually varies significantly as a function of offset, while for reflections from other interfaces the amplitude is in most instances substantially independent of offset.

It has long been known that the amplitude of the reflections of a seismic signal from the layered structure of a subterranean hydrocarbon reservoir are frequency dependent. See, for example, N. A. Haskell, "The Dispersion of Surface Waves on Multilayered Media," Bulletin of the Seismological Society of America, 1953, Vol. 43, No. 1, pp 17–34.

The related phenomenon of the frequency dependence of amplitude attenuation of seismic waves which have propagated through a subterraneam formation is employed in the geophysical exploration technique disclosed in U.S. Pat. No. 3,292,143, issued Dec. 13, 1966 to Russell. Russell discloses filtering a seismic trace through two band-pass filters, and then producing a signal whose amplitude at any time is the ratio of the amplitudes of the two signals produced at the output of the filters.

However, Russell neither discloses nor suggests band-pass filtering the traces comprising a CDP gather. Nor does Russell disclose or suggest producing a display of seismic data in which band-pass filtered seismic traces associated with a common reflection point are displayed in order of progressively changing offset values or frequency content, for the purpose of facilitating direct hydrocarbon identification or for any other purpose.

Nor do the Ostrander patents discussed above disclose any method for examining amplitude variations with frequency, as an indicator of the presence of hydrocarbons in a subterranean earth formation or for any other purpose. Prior to the present invention, frequency-dependent amplitude variations have not been used as a direct hydrocarbon indicator. The present invention is a technique for preparing a display of seismic data for the purpose of facilitating the use of frequency-dependent amplitude variations, as well as the use of offset-dependent amplitude variations, as a direct indicator of the presence of hydrocarbons in a subterranean earth formation.

The present invention facilitates an improved direct hydrocarbon identification technique by providing a new type of seismic data display. The display of the invention permits convenient examination of the reflectivity of a subterranean interface of interest as a function of both frequency and source-receiver offset. Until the present invention, seismic data has not been displayed in a manner permitting convenient examination of both the source-receiver offset dependence and frequency dependence of reflectivity. The inventive display has the additional advantage of reducing the effect of noise on data interpretation, since the dominant contribution of noise is likely to be in a different frequency range than are the primary reflections of interest. Also, the inventive display reduces the effect of attenuation on data interpretation by permitting examination of offset-dependent data over a selected narrow frequency range.

SUMMARY OF THE INVENTION

The present invention is a method for preparing a display of seismic data obtained from multiple-point coverage of a subterranean earth formation using an array of seismic sources and acoustic receivers. A set of seismic traces is obtained (for example, by performing the CDP seismic technique) in such a manner that each trace is associated with a source-receiver pair separated by a particular offset distance, and all the traces are associated with a common subsurface reflection point. Such a set of traces will sometimes also be referred to herein as a "CDP gather" of traces. Each of the traces is filtered through a bank of band-pass filters to produce a set of filtered traces, each having a different frequency content. Alternatively, the filtered traces associated with a particular frequency band are displayed in order of progressively changing offset values.

In a preferred embodiment, the filtered traces are displayed in color, so that the amplitude of each portion of a filtered trace is represented by a particular color. In another preferred embodiment, the seismic traces are processed (preferably prior to the bank-pass filtering step) to reduce source-generated noise, to compensate for non-geologic factors such as geometric divergence and source strength variation, and to flatten hyperbolic (or pseudo-hyperbolic) primary reflections.

In another preferred embodiment, groups of filtered traces having offset values in a selected range and representing the output of one of the band-pass filters are stacked together. In this embodiment, the offset values in each particular selected range preferably differ from each other by no more than about 500 feet. The stacked traces associated with a common range of offset values (and hence, with an average offset value) are displayed in order of progressively changing frequency content. Alternatively, stacked traces associated with a common frequency band are displayed in order of progressively changing ranges of offset values (i.e. average offset values).

BRIEF DESCRIPTION OF THE DRAWINGS

FIG. 1 is an individual seismic trace (T) of the type supplied to a bank of band-pass filters in performing the method of the invention.

FIG. 2 is a graph of the frequency response curves of twenty band-pass filters ($F_1$ through $F_{20}$) of the type used in performing the method of the invention. The vertical axis of FIG. 2 represents the amplitude of the filter output in response to a signal, having unit amplitude, which is incident at the filter input. The horizontal axis represents the frequency of the incident signal.

FIG. 3 shows four filtered seismic traces ($F_1T$, $F_2T$, $F_3T$, and $F_{20}T$), each representing the output of one of the band-pass filters whose response curves are shown in FIG. 2 in response to the incidence of seismic trace T (of FIG. 1) at the filter input. Filtered trace $F_iT$ (where i=1, 2, 3 or 20) in FIG. 3 represents the output of filter $F_i$ in response to the incidence of trace T.

DETAILED DESCRIPTION OF THE PREFERRED EMBODIMENT

Figure 4:
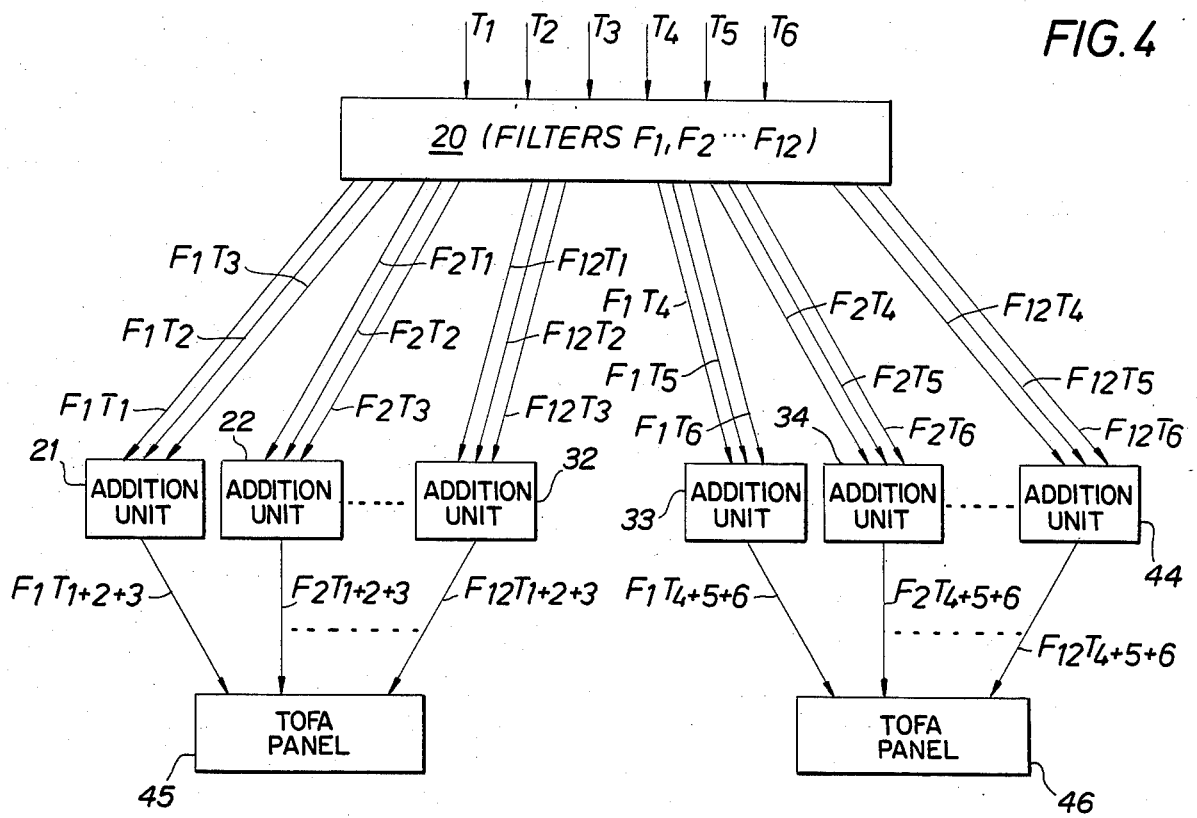
FIG. 4 is a schematic diagram showing the manner in which a CDP gather of six seismic traces ($T_1$ through $T_6$) may be processed in accordance with a preferred embodiment of the invention.

The present invention is a method for preparing a display of seismic data. The data to be displayed are obtained by employing an array of seismic sources and an array of acoustic receivers, preferably in accordance with a conventional common depth point seismic exploration technique, to generate a plurality of seismic traces. The sources and receivers are positioned so that at least two traces are indicative of reflections from a common subsurface point. Typically, a large number of groups of traces will be obtained, with each group (or "CDP gather") of traces representing acoustic signals reflected from a common subsurface reflecting point.

In a preferred embodiment of the invention, the traces to be displayed are first corrected in accordance with conventional seismic data processing techniques. Conventional seismic data processing techniques typically employ a suitable digital computing system to manipulate digitized recorded seismic signals. In such conventional techniques, the digitized points of the seismic signals are indexed according to amplitude, time, geopgraphical location (including the associated source and receiver location), and offset value (i.e., the distance between the associated source and receiver). The digitalized signals are typically processed in a digital computer to reduce source-generated noise, to compensate for non-geologic factors such as geometric divergence and source strength variation, and to flatten hyperbolic (or pseudo-hyperbolic) primary reflections. Such data correction techniques are well known in the art.

Each group of traces associated with a common subsurface reflection point, to be processed in accordance with the inventive method, may desirably be selected as follows. A conventional seismic section, comprising stacked CDP gathers of traces (each formed by stacking together the traces comprising a CDP gather) displayed side-by-side is analyzed for bright spots. A single stacked trace passing through a bright spot is identified. The individual traces in the CDP gather associated with this stacked trace are selected for subsequent processing in accordance with the inventive method.

In general, each trace in the group selected for further processing will include a number of non-zero frequency components. FIG. 1 is an example of a single trace of the type to be further processed in accordance with the invention.

Each trace in the selected group is next supplied to a bank of band-pass filters. Preferably, the filters are chosen so that a narrow bandwidth will be passed by each. In an example of one embodiment of the invention, the bank of filters includes twenty band-pass filters. $F_1$ through $F_{20}$, having frequency response curves as shown in FIG. 2.

FIG. 3 shows four filtered traces, $F_1T$, $F_2T$, $F_3T$ and $F_{20}T$, representing the result of processing traces T of FIG. 1 through filters $F_1$, $F_2$, $F_3$ and $F_{20}$, respectively.

In a preferred embodiment of the invention, the filtered traces produced at the outputs of the filters of the bank of band-pass filters, in response to incidence of a single trace at the filter inputs, are displayed in order of progressively changing frequency content. In this embodiment, the filtered traces to be displayed will each be associated with a common reflection point, and with a common source-to-receiver offset distance. In another preferred embodiment, the filtered traces produced at the output of a single one of the band-pass filters are displayed in order of progressively changing offset value. Each display of such a set of filtered traces, produced in accordance with either preferred embodiment, will sometimes be referred to herein as a time-offset-frequency-amplitude (TOFA) panel.

In accordance with the invention, a TOFA panel may be produced for each trace in a selected CDP gather of traces. Each such TOFA panel will either be associated with a common offset value or with a common frequency band.

In one embodiment, each TOFA panel will have the appearance of a set of filtered traces of the type shown in FIG. 3, displayed on a side-by-side basis. Alternatively, each TOFA panel may be produced by converting the filtered traces into a color display. The color display is produced by assigning (according to a conventional technique) a particular color to characterize the amplitude of each point of each filtered trace. In this alternative embodiment, the TOFA panels will consist of a two-dimensional grid of colored regions, with each region in the colored grid having a time coordinate and a frequency (or offset value) coordinate.

The TOFA panels may be interpreted as follows. At an expected reflection time associated with a subsurface zone suspected to be a hydrocarbon reservoir, the interpreter identifies a characteristic frequency or frequencies at which pronounced amplitude variations occur as a function of offset. Such frequency-dependent amplitude variations result in general from a number of factors, including: (1) the physical properties of the reservoir; (2) the bed geometry; and (3) the seismic pulse characteristics. To eliminate the contributions from the second and third factors, the interpreter must calibrate the observed amplitude variations for the subsurface zone at a well position against those of synthetic seismograms constructed from well-log data. The resultant diagnostic behavior of frequency-dependent amplitude variations can be used to extrapolate the hydrocarbon reservoir away from the well site.

Figure 5:
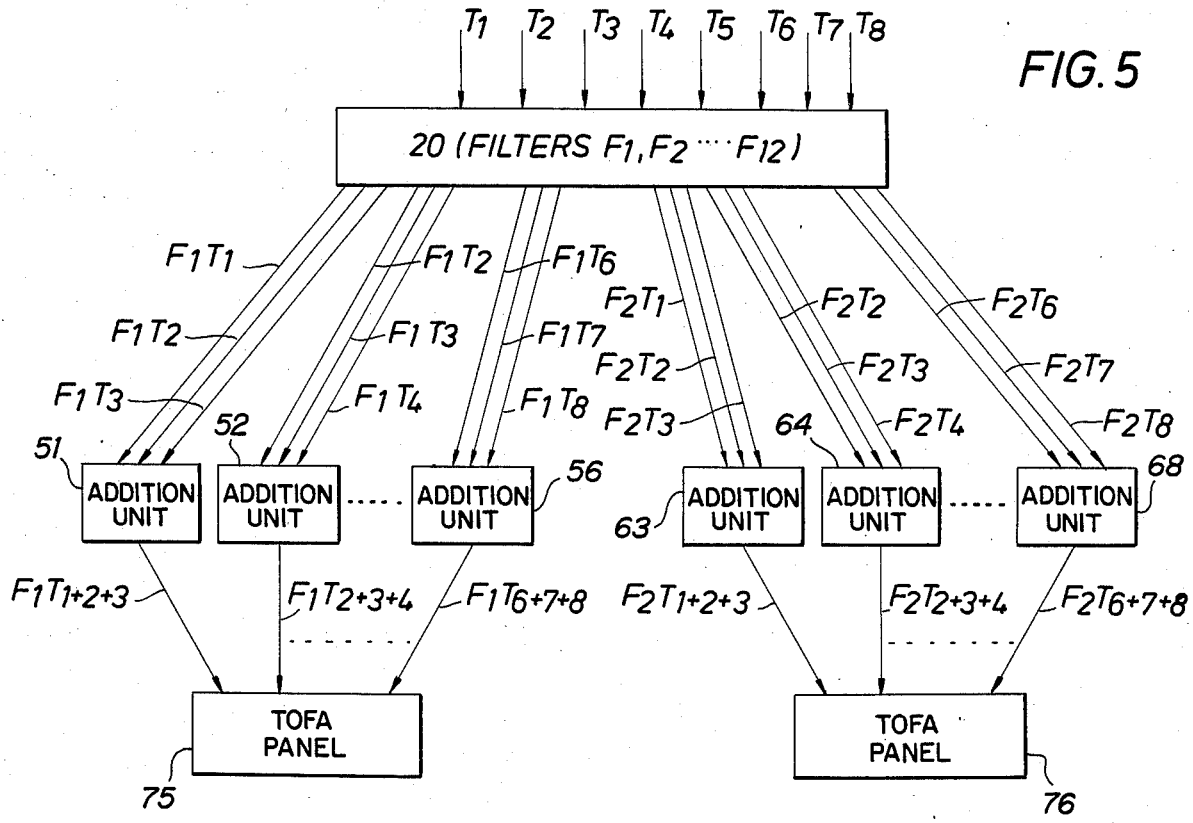
FIG. 5 is a schematic diagram showing the manner in which a CDP gather of eight seismic traces ($T_1$ through $T_8$) may be processed in accordance with another preferred embodiment of the invention.

Variations on the embodiments described above will next be discussed with reference to FIGS. 4 and 5. In order to stabilize the estimates of reflection amplitude variation with frequency, it is desirable to average the outputs of each band-pass filter for each of a set of traces having consecutive offset values. FIGS. 4 and 5 each show schematically one manner in which such an averaging process may be performed in an alternative preferred embodiment of the invention.

Traces $T_1$, $T_2$, $T_3$, $T_4$, $T_5$ and $T_6$ of FIG. 4 comprise a CDP gather. Thus, each is associated with a common reflection point but each is associated with a different source-receiver offset value. Traces $T_1$ through $T_6$ are filtered through bank 20 of twelve band-pass filters $F_1$ through $F_{12}$. It is within the scope of the invention that filter bank 20 include more than or less than twelve filters, though twelve are indicated in the example shown in FIG. 4. The output of filter bank 20 will include seventy-two filtered traces $F_iT_j$ (twelve associated with each offset value), where the subscript "i" identifies the filter which operated on the filtered trace, and the subscript "j" identifies the trace (one of traces $T_1$ through $T_6$) operated on by filter $F_i$. Assuming that consecutively increasing values of subscript j represent consecutively increasing values of source-receiver offset, the filtered traces ($F_iT_1$, $F_iT_2$ and $F_iT_3$) associated with traces $T_1$, $T_2$ and $T_3$, for each filter, are stacked together in identical addition units 21 through 32 (addition units 23-31 are not shown in FIG. 4). Filtered traces $F_1T_1$, $F_1T_2$ and $F_1T_3$ are stacked in addition unit 21, filtered traces $F_2T_1$, $F_2T_2$ and $F_2T_3$ are stacked in addition unit 22, and so on. The stacked, filtered signal produced at addition unit 21 is denoted as $F_1T_{1+2+3}$. More generally, the stacked, filtered signal produced at the output of addition unit k (where $21 \leq k \leq 32$) is designated in FIG. 4 as $F_zT_{1+2+3}$, where $z=k-20$. The stacked, filtered signals produced at the output of addition units 21 through 32 are displayed in order of progressively changing frequency content as TOFA panel 45, in the same manner as the filtered traces discussed above with reference to FIG. 3 are displayed to produce a TOFA panel.

In like manner, the filtered traces associated with traces $T_4$, $T_5$ and $T_6$, for each filter in bank 20, are stacked together in identical addition units 33 through 44 (units 34 through 43 are not shown in FIG. 4). The stacked, filtered signal produced at the output of addition unit p (where $33 \leq p \leq 44$) is designated in FIG. 4 as $F_mT_{4+5+6}$, where $m=p-32$. These stacked, filtered signals are displayed in order of progressively changing frequency content as TOFA panel 46.

Traces $T_1$, $T_2$, $T_3$, $T_4$, $T_5$, $T_6$, $T_7$ and $T_8$ of FIG. 5 comprise a CDP gather. Thus, each is associated with a common reflection point but each is associated with a different source-receiver offset value. Traces $T_1$ through $T_8$ are filtered through bank 20 of twelve band-pass filters $F_1$ through $F_{12}$. It is within the scope of the invention that filter bank 20 include more than or less than twelve filters, though twelve are indicated in the example shown in FIG. 5. The output of filter bank 20 will include ninety-six filtered traces $F_iT_j$ (twelve associated with each offset value), where the subscript "i" identifies the filter which operated on the filtered trace, and the subscript "j" identifies the trace (one of traces $T_1$ through $T_8$) operated on by filter $F_i$. Assuming that consecutively increasing values of subscript j represent consecutively increasing values of source-receiver offset, the filtered traces ($F_1T_j$, $F_1T_{j+1}$, $F_1T_{j+2}$) associated with filter $F_1$, are stacked together in identical addition units 51 through 56 (addition units 52-55 are not shown in FIG. 5). Filtered traces $F_1T_1$, $F_1T_2$ and $F_1T_3$ are stacked in addition unit 51, filtered traces $F_1T_2$, $F_1T_3$ and $F_1T_4$ are stacked in addition unit 52, and so on. The stacked, filtered signal produced at addition unit 51 is denoted as $F_1T_{1+2+3}$. More generally, the stacked, filtered signal produced at the output of addition unit k (where $51 \leq k \leq 56$) is designated in FIG. 5 as $F_1T_{r+s+t}$, where $r=k-50$, $s=k-49$, and $t=k-48$. The stacked, filtered signals produced at the output of addition units 51 through 56 are displayed in order of progressively changing frequency content as TOFA panel 75, in the same manner as the filtered traces discussed above with reference to FIG. 3 are displayed to produce a TOFA panel.

In like manner, the filtered traces associated with filter $F_2$ are stacked together in identical addition units 63 through 68 (units 64 through 67 are not shown in FIG. 5). The stacked, filtered signal produced at the output of addition unit p (where $63 \leq p \leq 68$) is designated in FIG. 5 as $F_2T_{u+v+w}$, where $u=p-62$, $v=p-61$, and $w=p-60$. These stacked, filtered signals are displayed in order of progressively changing frequency content as TOFA panel 76.

The offset spread associated with the signals stacked in a given addition unit in either FIG. 4 or FIG. 5 should preferably not exceed approximately 500 feet.

Addition units 21 through 44 and 51 through 68 may be conventional hardwired analog addition circuits (in the embodiments in which analog signals are output by bank 20 of filters). In alternative embodiments in which digital signals are produced at the output of bank 20 of filters, addition units 21 through 44 and 51 through 68 may be hardwired digital addition circuits or may be replaced by suitable software for stacking the digital signals. Suitable softward for performing the operation of stacking together the desired digital signals in the software embodiment is in widespread use in the art, and may readily be generated by translating the stacking operation into a series of computer instructions in a manner that will be apparent to those ordinarily skilled in the art of seismic data processing.

The above description is merely illustrative of the present invention. Various changes in the details of the embodiments of the method described may be within the scope of the appended claims without departing from the spirit of the invention.

I claim:

1. A method for producing a display of seismic data, including the steps of:
    (a) generating a number of seismic traces, each trace representing an acoustic signal received at a receiver of a receiver array after propagating away from an acoustic source of a source array, and each trace being associated with a common reflecting point and with an offset value equal to the distance between the associated source and receiver;
    (b) filtering each trace through a bank of band-pass filters to produce a set of filtered traces, each associated with a common reflecting point, an offset value, and a frequency band; and
    (c) displaying at least two of the filtered traces in order of progressively changing offset value, where the displayed filtered traces are associated with a common frequency band.

2. The method of claim 1, also including the step of displaying at least two of the filtered traces associated with a common offset value in order of progressively changing frequency content.

3. The method of claim 1, wherein the filtered traces are displayed in color, with each amplitude of a portion of a filtered trace being associated with a particular color.

4. The method of claim 2, wherein the step of displaying common offset value filtered traces in order of progressively changing frequency content is repeated for each offset value.

5. The method of claim 1, wherein the step of displaying common frequency band filtered traces in order of progressively changing offset value is repeated for each frequency band.

6. A method for producing a display of seismic data, including the steps of:
    (a) generating a plurality of seismic traces, each trace representing an acoustic signal received at a receiver of a receiver array after propagating away from an acoustic source of a source array, and each trace being associated with a common reflecting point and with an offset value equal to the distance between the associated source and receiver;
    (b) filtering each trace through a bank of band-pass filters to produce a set of filtered traces, each associated with a common reflecting point, an offset value, and a frequency band;
    (c) selecting a group of filtered traces having a common reflecting point and frequency band, and having offset values within a selected range;
    (d) stacking the filtered traces of the group selected in step (c);
    (e) repeating steps (c) and (d) for each of a number of different frequency bands;
    (f) displaying, in order of progressively changing frequency content, the stacks of filtered traces associated with a common reflecting point and a common range of offset values; and
    (g) repeating steps (c), (d), (e), and (f) for each of a number of different selected ranges of offset values.

7. The method of claim 6 wherein, in step (f), the stacks of filtered traces are displayed on a side-by-side basis in order of progressively changing frequency content.

8. The method of claim 6, wherein the stacks of filtered traces are displayed in color, with each amplitude of a portion of a stack being associated with a particular color.

9. The method of claim 6, wherein the offset values in each selected range differ from each other by no more than approximately 500 feet.

10. The method of claim 1 or 6, wherein step (a) includes the substeps of:
    (i) compensating each received acoustic signal for non-geologic factors such as geometric divergence and source strength variation; and
    (ii) performing corrections on each received acoustic signal sufficient to flatten the primary reflections associated therewith.

11. A method for producing a display of seismic data, including the steps of:
    (a) generating a plurality of seismic traces, each trace representing an acoustic signal received at a receiver of a receiver array after propagating away from an acoustic source of a source array, and each trace being associated with a common reflecting point and with an offset value equal to the distance between the associated source and receiver;
    (b) filtering each trace through a bank of band-pass filters to produce a set of filtered traces, each associated with a common reflecting point, an offset value, and a frequency band;
    (c) selecting a group of filtered traces having a common reflecting point and associated with a common frequency band, and having offset values within a selected range;
    (d) stacking the filtered traces of the group selected in step (c);
    (e) repeating steps (c) and (d) to stack at least two groups of filtered traces, each group associated with the same frequency band, and each stack of filtered traces being associated with a different selected range of offset values; and
    (f) displaying the stacks of filtered traces in order of progressively changing ranges of offset values.

12. The method of claim 11 wherein, in step (f), the stacks of filtered traces are displayed on a side-by-side basis in order of progressively changing offset value range.

13. The method of claim 11, wherein the stacks of filtered traces are displayed in color, with each amplitude of a portion of a stack being associated with a particular color.

14. The method of claim 11, wherein steps (c), (d), (e) and (f) are repeated for each of a number of different selected frequency bands.

15. The method of claim 11 or 14, wherein the offset values in each selected range differ from each other by no more than approximately 500 feet.

16. The method of claim 11, wherein step (a) includes the substeps of:
  (i) compensating each received acoustic signal for non-geologic factors such as geometric divergence and source strength variation; and
  (ii) performing corrections on each received acoustic signal sufficient to flatten the primary reflections associated therewith.

17. A method for producing a display of seismic data, including the steps of:
  (a) collecting CDP gathers of seismic traces, each trace in one of the gathers being associated with a common reflecting point and with an offset value;
  (b) filtering each trace through a bank of band-pass filters to produce a set of filtered traces; and
  (c) displaying at least some of the filtered traces in order of progressively changing offset value, where the displayed filtered traces are associated with a common frequency band.

18. The method of claim 17, wherein the filtered traces are displayed in color, with each amplitude of a portion of a filtered trace being associated with a particular color.

* * * * *